April 30, 1940.  E. B. DEWEY  2,199,304
ENLARGING EASEL FOR PHOTOGRAPHIC PAPERS
Original Filed March 13, 1939    2 Sheets-Sheet 1
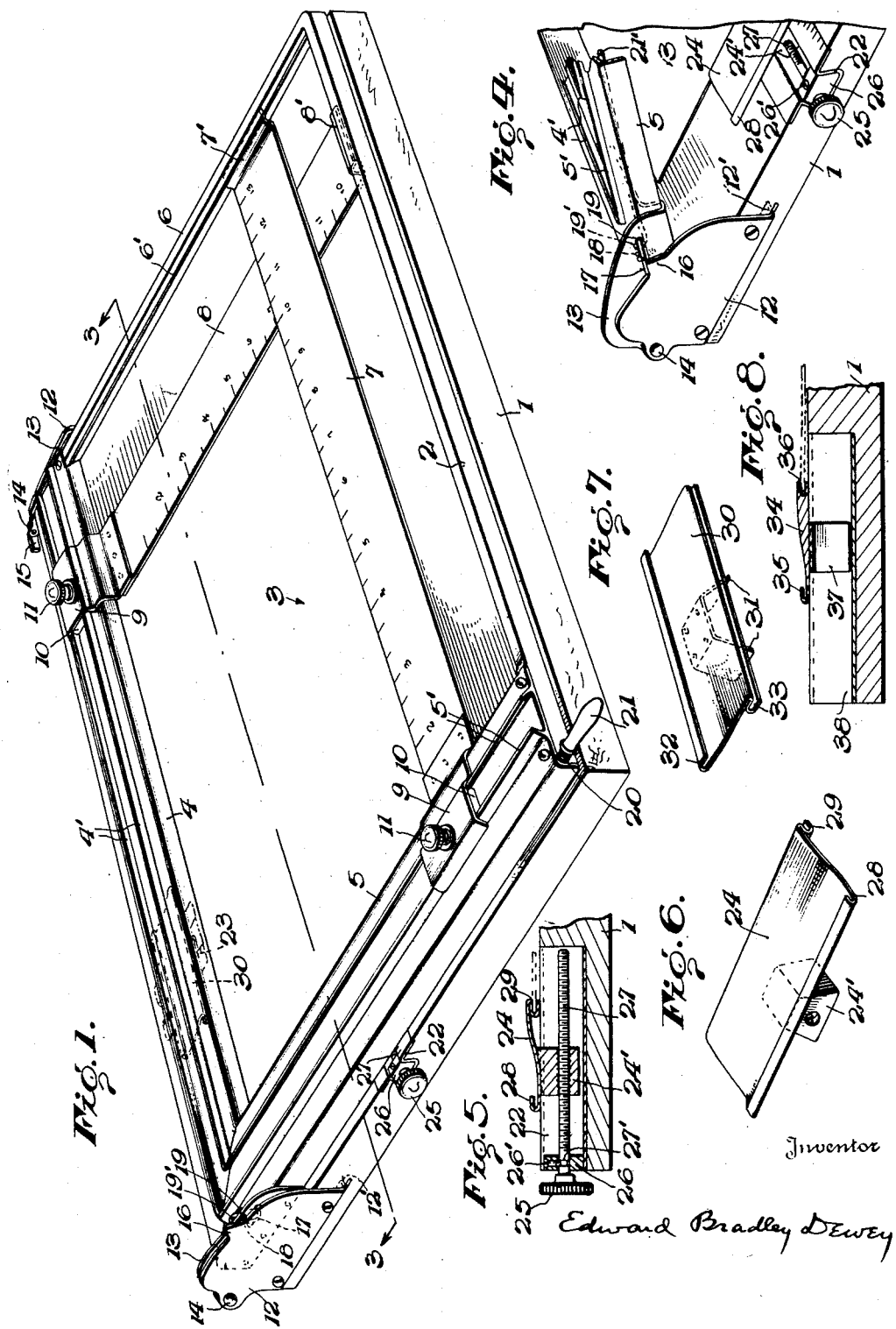
Inventor
Edward Bradley Dewey

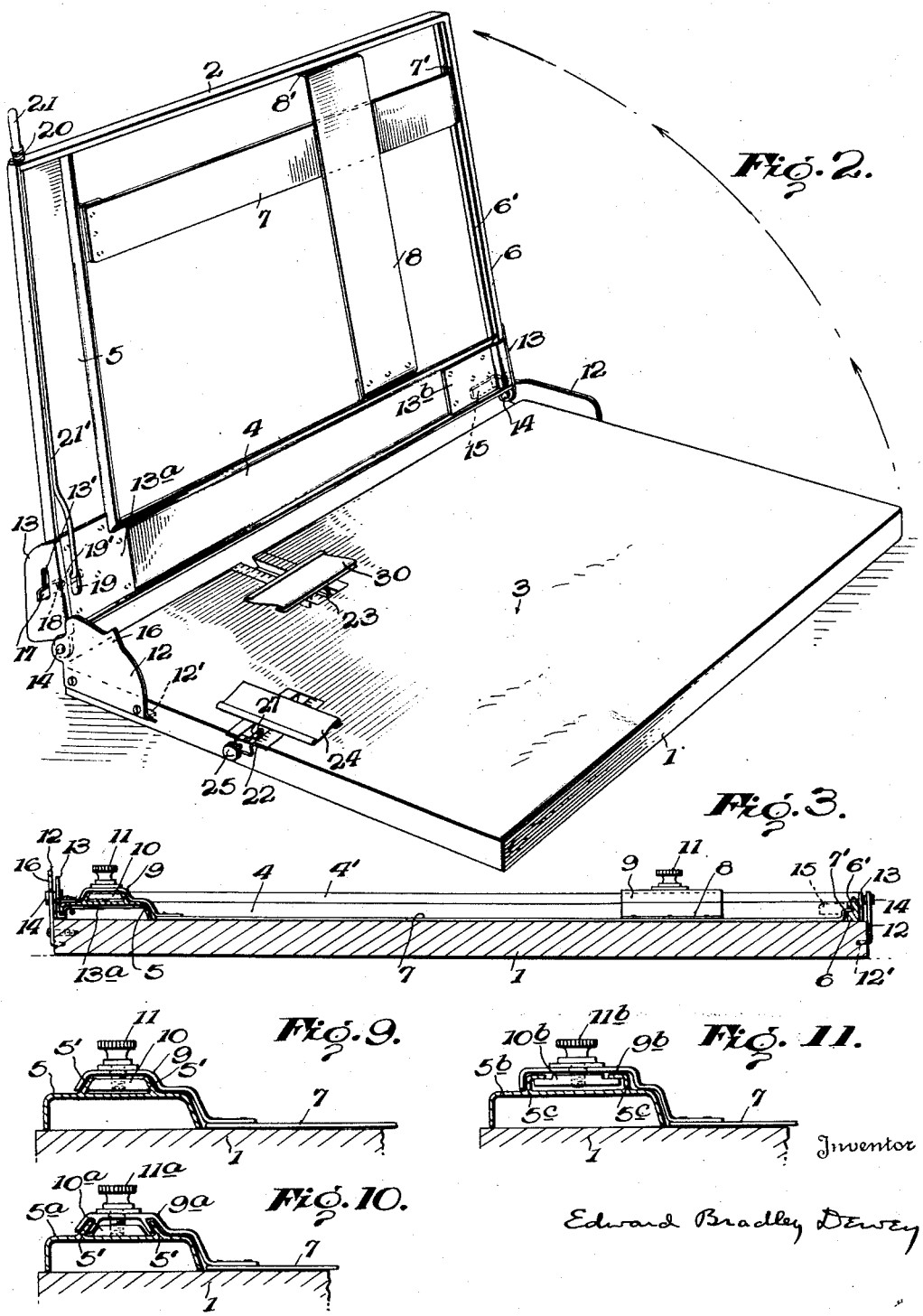

Patented Apr. 30, 1940

2,199,304

UNITED STATES PATENT OFFICE 2,199,304

ENLARGING EASEL FOR PHOTOGRAPHIC PAPERS

Edward Bradley Dewey, Washington, D. C.

Application March 13, 1939, Serial No. 261,618
Renewed February 21, 1940

8 Claims. (Cl. 88—24)

My invention relates to enlarging easels and has particular reference to easels for enlarging photographic pictures.

The object of my invention is to provide an enlarging easel for photographic use which is simple in construction and inexpensive to manufacture. It is rigid in construction and will hold photographic paper flat in spite of its tendency to curl.

My invention relates to a photographic easel made of any metal, preferably of an aluminum alloy formed by the extruded process, which may be welded or fastened together by other methods.

Other objects and advantages of my invention will appear from the following description and accompanying drawings in which similar numerals refer to similar parts in the several views.

Figure 1 is a plane view of an easel embodying the invention.

Figure 2 is a view of the easel showing it fully opened and resting against stop 15.

Figure 3 is a section along the line 3—3.

Figure 4 is a section of Figure 1 showing the easel partially opened and locked in that position by lug 17, resting on hinge 16.

Figure 5 shows the construction of the adjustable paper guide.

Figure 6 shows a detail of Figure 5.

Figures 7 and 8 show alternate methods of constructing Figure 5.

Figure 9 shows the detail method of constructing the sliding and locking clamp.

Figures 10 and 11 show alternate methods of constructing Figure 9.

My easel consists of a base 3 preferably made of wood or a light metal such as aluminum alloy. The base is placed under an enlarger (not shown) and receives a picture to be enlarged, so that for convenience in focusing, I prefer to have the upper surface of the base finished in a dull white.

The base has a L-shaped frame 4 and 5 pivotedly attached to hinges 12 at 14. Members of the frame 4 and 5 have a precision slide 4' and 5' formed in a single piece by the extruded process. Attached to frame 4 and 5 is a slotted bar 2 forming a rectangle with the L frame 4 and 5. The bar 6 has a slot 6' running along the inside edge and along the inside edge of bar 2. The slide 9 is formed to slide over slides 4' and 5' and is locked in place by wedge 10 and lock screw 11. Attached to slide 9 is a scale 7 and 8 whose ends 7' and 8' are bent up and out to slide in the groove 6' in bar 6 giving rigidity to scales 7 and 8. Hinge 13 is attached to member 4 and hinge 12 is attached to the base board and fits into slot 12'. Hinge 13 is extended to 13a under member 4 and 5 and is welded or riveted to said member forming an L. Hinge 13 is extended to 13b under member 4 and attached thereto.

Handle 21 passing through frame 2 and through hole 19 is attached to catch 17 at 19' and lug 17 which passes through hinge 13 at slot 13' is pivoted at 18 and is acted on by spring 20. After being raised about 30°, catch 17 is forced by spring 20 over notch 16 on hinge 12 thereby holding frame 2 in an opened position allowing both hands free to adjust paper on board 3, Figure 4. By pressing in handle 21 against spring 20, catch 17 is released allowing frame to return to base board 3 holding paper in position.

Paper guide 22, Figure 1, is a piece of metal formed to fit a slot in board 1 being larger at the bottom than at the top and having the upper ends bent outwardly over as shown with a scale stamped thereon. Fitting in the slot thus formed is a piece of metal 26, Figure 5, with a hole through which passes screw 27 and acts as a bearing for screw 27 which is grooved at 27' and a screw 26' fitting in groove 27' keeps screw 27 in position. Paper guide 24 is threaded at 24' so that when knob 25 is turned, paper guide 24 moves forward and backward along screw 27 varying the margin of the paper. Notches 28 and 29 hold the edge of the paper.

Figure 7 shows an alternate method of making the paper margin showing plate 30, paper grooves 32 and 33 and a spring clip 31 to slide in groove at 22, Figure 1. Figure 8 shows the same method but plate 34 with grooves 35 and 36 cast in one piece.

I claim—

1. An enlarging easel comprising a base, an L-shaped masking frame hingedly supported on the base, the L-shaped masking frame having a recess formed on its under side and a dovetail slide formed on its upper side all in a single piece of metal, an L-shaped frame attached to the L-shaped hinged frame at either end forming a rectangle with the L-shaped hinged frame, with a groove formed on its inner surface, two movable masking bands sliding perpendicularly to the hinged L-shaped member in the dovetail slide and means of locking same and having an offset on each end sliding in the grooves in the opposite sides holding them rigidly in the same plane with the hinged L-shaped member, a hinge on the base supporting the L-shaped frame and formed with a projection, a spring operated lug pivotedly attached to the L-shaped frame, operable by a lever from the front of the easel, and controlling the spring operated lug to hold the easel open at a small acute angle, and two movable margin guides supported on the base and having dual paper stops formed by grooves along each parallel edge.

2. An enlarging easel comprising a base, a masking frame hingedly supported on the base; paper guides on the base; a plate on the base formed with a projection; a lug movably mounted on the frame and normally disposed in position to engage the projection to hold the frame open at an angle with respect to the base; and means mounted on the front of the frame and connected with the lug for moving the lug to release the frame.

3. In an enlarging easel as set forth in claim 2, said moving means comprising a shiftable member connected with the lug and projecting beyond the front of the frame; and yieldable means maintaining the member in position to hold the lug in normal position.

4. In an enlarging easel as set forth in claim 2, said paper guides comprising movable margin guides having spaced parallel edges supported on slides in the base, and each guide having dual paper stops formed by grooves along the parallel edges opening in the same direction.

5. In an enlarging easel as set forth in claim 2, said frame being L-shaped and having a recess formed in its underside to accommodate the paper guides, and having a guide-way formed in its upperside; a second L-shaped frame attached to the ends of the first frame and forming therewith an open rectangle; the second frame having a groove formed in its inner face; and masking bands each having a slide operable in the guideway and having an offset end sliding in the groove, to hold the band in the plane of the bottom of the frame.

6. An enlarging easel comprising a base, a masking frame hingedly supported on the base; movable paper guides having spaced parallel edges supported on slides in the base, and having dual paper margin stops formed by grooves along the parallel edges opening in the same direction; a plate member on the base formed with a projection, a lug pivotedly mounted on the frame and normally disposed in position to engage the projection to hold the frame open at an angle with respect to the base; and a shiftable member connected with the lug and projecting beyond the front of the frame; and yieldable means maintaining the member in position to hold the lug in normal position.

7. An enlarging easel comprising a base having adjustable slides therein; a masking frame hingedly supported on the base; movable masking bands slidably mounted on the frame; and movable paper guides having spaced parallel edges supported on the slides of the base and having dual paper margin stops formed by grooves along the parallel edges opening in the same direction.

8. In an enlarging easel as set forth in claim 7, said frame being L-shaped and having a recess formed in its underside to accommodate the paper guides, and having a guideway formed in its upperside; a second L-shaped frame attached to the ends of the first frame and forming therewith an open rectangle, the second frame having a groove formed in its inner face; and said bands each having a slide operable in the guideway and having an offset end sliding in the groove, to hold the band in the plane of the bottom of the frame.

EDWARD BRADLEY DEWEY.